T. K. SMITH.
Churn.
No. 60,077.
Patented Nov. 27, 1866.
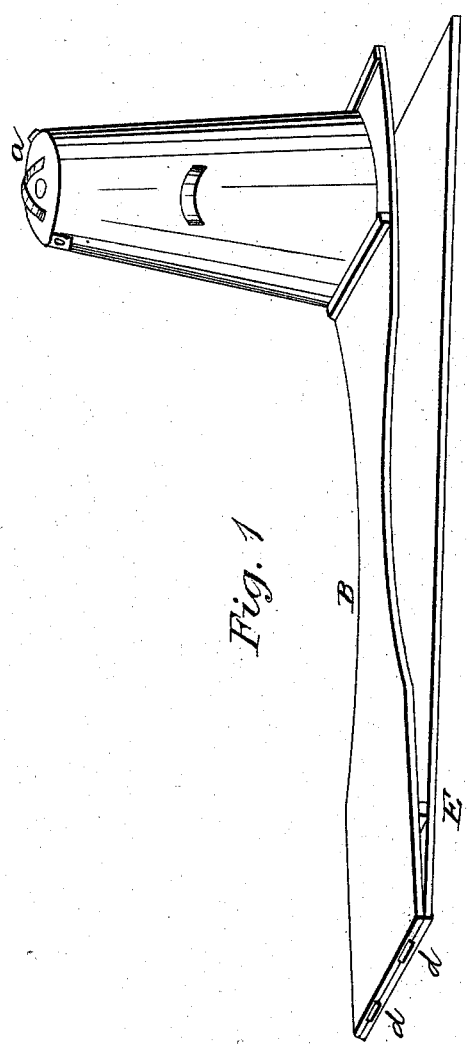
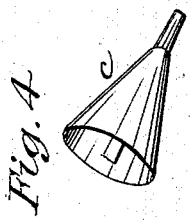
Fig. 4.
Fig. 3.
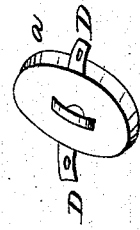
Fig. 2.
Fig. 1.
Witnesses:
John E. Lacey
W. E. Shepherd
Inventor:
T. K. Smith

United States Patent Office.

IMPROVEMENT IN CHURN.

T. K. SMITH, OF OSKALOOSA, IOWA.

Letters Patent No. 60,077, dated November 27, 1866.

SPECIFICATION.

Be it known that I, T. K. SMITH, of Oskaloosa, of the county of Mahaska, and State of Iowa, have invented a new and improved Churn; and I do hereby declare that the following is a full and exact description thereof.

The nature of my invention consists as follows, reference being had to the annexed drawings, making a part of this specification.

Figure 1 is a perspective view of said churn.
Figure 2 is a top view of the lid of said churn.
Figure 3 is a bottom view of said lid.
Figure 4 is a view of a funnel to be placed in said churn to prevent the milk from splashing out.

In fig. 1, and in other figures, A is the churn lid, B is the spring board upon which the churn rests, which spring board is moved by placing the foot upon it and shaking it; C, a funnel which fits underneath the lid, fig. 4; D D, are the hinges connecting the two sections of the spring board; E is a stick upon which the top section of the spring board rests; F is a concave plate fastened to the under side of the churn lid to prevent the milk from splashing through the hole in the lid; G is a handle fastened crosswise in the funnel by which it is taken out or put in the churn.

What I claim as my invention is the spring board and churn combination, whereby I have made a churn that can be used without a dasher of any kind. In said drawing, blue color denotes metal, (tin,) and buff denotes wood.

T. K. SMITH.

Witnesses:
JOHN F. LACEY,
I. RHINEHART.